UNITED STATES PATENT OFFICE

2,328,232

2,4-DIOXO-3,3-DIALKYL-PYRROLIDINES AND PROCESS FOR THE MANUFACTURE OF SAME

Otto Schnider, Basel, Switzerland, assignor to Hoffmann-La Roche Inc., Nutley, N. J., a corporation of New Jersey No Drawing. Application November 6, 1939, Serial No. 303,161. In Germany November 30, 1938

11 Claims. (Cl. 260—313)

Of the pyrrolidine compounds of the general formula

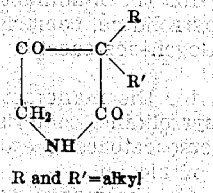

R and R'=alkyl only the 2,4-dioxo-3,3-dimethyl-pyrrolidine has hitherto been prepared. It can be obtained by the action of $NH_3$ or $(NH_4)_2CO_3$ on $\alpha,\alpha$-dimethyl-$\gamma$-bromoacetoacetic ester (Berichte der Deutschen Chemischen Gesellschaft, vol. 32, year 1899, page 1199).

This reaction is to be expected with all homologues which, in the same way as $\alpha,\alpha$-dimethyl-$\gamma$-halogen-acetoacetic ester, are capable of forming acid amides by the action of ammonia. Accordingly, 2,4-dioxo-3-methyl-3-ethyl-pyrrolidine can, for instance, be prepared from $\alpha$-methyl-$\alpha$-ethyl-$\gamma$-halogen-acetoacetic ester, for the methyl-ethyl-acetoacetic acid amide is obtainable in the normal way from the corresponding ester. However, all dialkyl-acetoacetic esters in which both alkyl groups contain two or more carbon atoms are incapable of reacting with ammonia to form amides (Monatshefte für Chemie, vol. 27, year 1906, pages 1085–1088; Liebig's Annalen der Chemie, vol. 231, year 1885, page 244).

It has now been found that the $\alpha,\alpha$-dialkyl-$\gamma$-halogen-acetoacetic esters, of which both alkyls contain 2 or more carbon atoms, can nevertheless be converted into pyrrolidine derivatives by the action of ammonia. In accordance with the present invention 2,4-dioxo-3,3-dialkyl-pyrrolidines, of which both alkyl radicals contain more than 1 carbon atom, can be obtained by allowing ammonia to act on the corresponding $\alpha,\alpha$-dialkyl-$\gamma$-halogen-acetoacetic ester in presence of a solvent. The reaction proceeds according to the following equation:

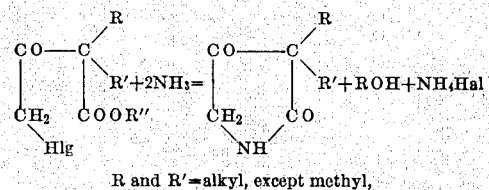

R and R'=alkyl, except methyl, R''=alkyl.

The reaction cannot take place through the intermediate formation of the amides.

The new compounds are readily crystallisable, colourless substances which can be distilled without decomposition. They are easily soluble in the usual organic solvents. Furthermore, the lower members of the group are water-soluble. Contrary to the hitherto known pyrrolidine derivative substituted in the 3-position, the 2,4-dioxo-3,3-dialkyl-pyrrolidines, of which both alkyl radicals each contain at least 2 carbon atoms, are very active biologically. They have a soporiferic effect. Moreover, some derivatives (for instance 2,4-dioxo-3,3-di-n-propyl-pyrrolidine) are even capable of terminating epileptiform spasms already in small doses.

The new compounds are to be employed as medicinal preparations.

Example 1

70 parts by weight of ammonia gas are introduced into 350 parts by weight of alcohol while cooling well. To the cooled alcoholic ammonia 265 parts by weight of $\alpha,\alpha$-diethyl-$\gamma$-bromacetoacetic ester are added in one portion. After a while the solution slowly becomes warm, and the separation of ammonium bromide soon begins. After 24 hours the excess ammonia gas and the alcohol are distilled off in vacuo. The residue is boiled out twice with 200 parts by weight of a benzene-alcohol mixture (1:1) and the undissolved ammonium bromide separated. The oily residue remaining after the solvent has been driven off is distilled in vacuo.

The 2,4-dioxo-3,3-diethyl-pyrrolidine boils at 175–178° C. at a pressure of below 12 mm. The distillate which soon solidifies is dissolved while still warm in double the quantity of benzene and then treated with petroleum ether until turbidity sets in. The water-soluble 2,4-dioxo-3,3-diethyl-pyrrolidine precipitated in well developed colourless crystals, melts at 88–89° C. after drying.

Example 2

248.5 parts by weight of $\alpha,\alpha$-di-n-propyl-$\gamma$-chloracetoacetic ester are dissolved in cold methyl-alcoholic ammonia solution which has been prepared by the introduction of 70 parts by weight of ammonia gas into 300 parts by weight of methyl alcohol. This solution is heated to 100° C. for 6 hours in an autoclave. The liquid interspersed with ammonium chloride is then concentrated and the residue treated with 200 parts by weight of water. The oily reaction product is taken up in benzene and the residue remaining after having driven off the benzene distilled in vacuo.

2,4-dioxo-3,3-di-n-propyl-pyrrolidine boils at 182–184° C. at a pressure below 12 mm. It at once crystallises in the receiver. It can be dissolved and allowed to crystallise from double the quantity of high-boiling petroleum ether; it melts at 117–118° C. When cold, it is rather difficultly soluble in water, when warm it is easily soluble therein.

*Example 3*

An ice-cold solution of 70 parts by weight of ammonia gas and 307 parts by weight of α-n-propyl-α-isobutyl-γ-bromacetoacetic ester in 350 parts by weight of alcohol is left to stand for 12 hours. The course of the reaction can be followed by the precipitation of the ammonium bromide; it is completed by heating for 6 hours to 50–60° C. The solution separated from ammonium bromide is concentrated in vacuo. The residue is mixed with 3-normal caustic soda until definitely alkaline to phenolphthaleine. The separated oil is taken up in benzene and distilled in vacuo after removal of the benzene.

The 2,4-dioxo-3-n-propyl-3-isobutyl-pyrrolidine distils over at 180–183° C. at a pressure below 12 mm. It can be dissolved and allowed to crystallise from dibutyl ether. It melts at 101–102° C. and is rather difficultly soluble in water.

*Example 4*

In a freezing mixture of ice and salt 400 parts by weight of alcohol are saturated with about 70 parts by weight of ammonia gas. In the freezing mixture 335 parts by weight of α-n-propyl-α-n-hexyl-γ-bromacetoacetic ester are added to the alcoholic ammonia and the resulting solution left to stand in the slowly melting freezing mixture. After about 6 hours the separation of ammonium bromide begins. After 48 hours alcohol and ammonia are driven off in vacuo, whereupon the residue is mixed with water and ether. The ethereal solution is evaporated and the remaining oil distilled in vacuo. The 2,4-dioxo-3-n-propyl-3-n-hexyl pyrrolidine coming over between 202 and 206° C. is dissolved and allowed to crystallise from 50% methanol. It melts at 60–61° C. and is difficultly soluble in water.

I claim:

1. A 2,4-dioxo-3,3-dialkyl-pyrrolidines of the formula

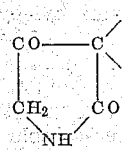

where R and R' are alkyl groups each containing two to six carbon atoms.

2. 2,4-dioxo-3,3-diethyl-pyrrolidine.

3. 2,4-dioxo-3,3-dipropyl-pyrrolidine.

4. Process for the manufacture of a 2,4-dioxo-3,3-dialkyl-pyrrolidine of which both alkyl groups contain at least 2 carbon atoms each, comprising reacting an α,α-dialkyl-γ-halogen-acetoacetic ester in which each alkyl substituent contains at least two carbon atoms with ammonia.

5. Process for the manufacture of a 2,4-dioxo-3,3-dialkyl-pyrrolidine of which both alkyl groups contain at least 2 carbon atoms each, comprising reacting an α,α-dialkyl-γ-halogen-acetoacetic ester in which each alkyl substituent contains at least two carbon atoms with ammonia in presence of a solvent.

6. Process for the manufacture of 2,4-dioxo-3,3-diethyl-pyrrolidine, comprising reacting α,α-diethyl-γ-halogen-acetoacetic ester with ammonia.

7. Process for the manufacture of 2,4-dioxo-3,3-diethyl-pyrrolidine, comprising reacting α,α-diethyl-γ-bromoacetoacetic ester with ammonia in presence of alcohol.

8. Process for the manufacture of 2,4-dioxo-3,3-dipropyl-pyrrolidine, comprising reacting α,α-dipropyl-γ-halogen-acetoacetic ester with ammonia.

9. Process for the manufacture of 2,4-dioxo-3,3-dipropyl-pyrrolidine, comprising reacting α,α-dipropyl-γ-chloroacetoacetic ester with ammonia in presence of methyl alcohol.

10. A process for the manufacture of a 2,4-dioxo-3,3-dialkyl-pyrrolidine in which each of the alkyl groups contains two to six carbon atoms, which comprises reacting an α,α-dialkyl-γ-halogen-acetoacetic ester in which each alkyl substituent contains two to six carbon atoms with ammonia.

11. A process for the manufacture of a 2,4-dioxo-3,3-dialkyl-pyrrolidine in which each of the alkyl groups contains two to six carbon atoms, which comprises reacting an α,α-dialkyl-γ-halogen-acetoacetic ester in which each alkyl substituent contains two to six carbon atoms with ammonia in the presence of the solvent.

OTTO SCHNIDER.